(12) United States Patent
Yamada et al.

(10) Patent No.: US 12,200,511 B2
(45) Date of Patent: Jan. 14, 2025

(54) METHOD AND APPARATUS OF BEAM FAILURE RECOVERY EXECUTED BY USER EQUIPMENT

(71) Applicant: SHARP KABUSHIKI KAISHA, Sakai (JP)

(72) Inventors: Shohei Yamada, Osaka (JP); Chongming Zhang, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 265 days.

(21) Appl. No.: 17/288,222

(22) PCT Filed: Oct. 21, 2019

(86) PCT No.: PCT/CN2019/112188
§ 371 (c)(1),
(2) Date: Apr. 23, 2021

(87) PCT Pub. No.: WO2020/083182
PCT Pub. Date: Apr. 30, 2020

(65) Prior Publication Data
US 2021/0392521 A1    Dec. 16, 2021

(30) Foreign Application Priority Data
Oct. 24, 2018  (CN) .......................... 201811248927.1

(51) Int. Cl.
*H04W 24/04*    (2009.01)
*H04W 74/04*    (2009.01)

(52) U.S. Cl.
CPC ........... *H04W 24/04* (2013.01); *H04W 74/04* (2013.01)

(58) Field of Classification Search
CPC . H04W 24/04; H04W 74/04; H04W 52/0216; H04W 52/0229; H04W 52/0245;
(Continued)

(56) References Cited

U.S. PATENT DOCUMENTS

2018/0227899 A1    8/2018    Yu et al.
2018/0234960 A1    8/2018    Nagaraja et al.
(Continued)

FOREIGN PATENT DOCUMENTS

CN    102612119 A    7/2012
CN    107534888 A    1/2018
(Continued)

OTHER PUBLICATIONS

Ericsson, "Correction for Successful termination of BFR", 3GPP TSG-RAN WG2 #103bis R2-1814777, PR China, Oct. 8-12, 2018 (Year: 2018).*
(Continued)

*Primary Examiner* — Benjamin H Elliott, IV
*Assistant Examiner* — Yewon Kim
(74) *Attorney, Agent, or Firm* — ScienBiziP, P.C.

(57) ABSTRACT

The invention provides a method performed by user equipment and user equipment. The user equipment is configured in a discontinuous reception (DRX) mode. The method performed by user equipment comprising: initiating a random access (RA) procedure if a value of a beam failure instance (BFI) counter is greater than or equal to a threshold, the threshold being configured by an information element (IE) beamFailureInstanceMaxCount; transmitting a RA preamble; starting a RA response window, the RA response window being configured in an IE BeamFailureRecoveryConfig; and monitoring a PDCCH on a search space indicated by an IE RecoverySearchSpaceId while the RA response window is running. The user equipment can reliably complete a procedure to recover from beam failure even if the user equipment is configured in a DRX mode, thereby improving the overall reliability and communication efficiency of a communication system related to the user equipment.

6 Claims, 4 Drawing Sheets

(58) Field of Classification Search
CPC . H04W 76/19; H04W 74/0833; H04W 76/28; H04W 24/02; H04W 76/27; Y02D 30/70; H04B 7/0695
See application file for complete search history.

(56) References Cited

U.S. PATENT DOCUMENTS

| | | | |
|---|---|---|---|
| 2020/0052769 A1* | 2/2020 | Cirik | H04L 1/0026 |
| 2021/0153285 A1* | 5/2021 | Hu | H04W 76/27 |
| 2021/0194756 A1* | 6/2021 | Babaei | H04B 7/088 |

FOREIGN PATENT DOCUMENTS

| | | |
|---|---|---|
| CN | 108513737 A | 9/2018 |
| CN | 108632007 A | 10/2018 |

OTHER PUBLICATIONS

Ericsson, "Corrections on BFR procedure in DRX", 3GPP TSG-RAN WG2 #103bis R2-1814795, PR China, Oct. 8-12, 2018 (Year: 2018).*

Asustek, "Correction to BFR procedure during DRX mode", 3GPP TSG-RAN WG2 #103-bis R2-1815239, RP China, Oct. 8-12, 2018 (Year: 2018).*

ASUSTEK:"BFR procedure during DRX mode", #GPP Draft; R2-1815238 BFR Procedure During DRX Mode, 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018, Sep. 28, 2018, pp. 1-4, XP051524596; the whole document.

Huawei et al.:"Correction on the termination of BFR", 3GPP Draft; R2-1814867 Correction for the Termination of BFR, 3rd Generation Partnership Project (3GPP), Mobile Compepence Centre; 650, Route Des Lucioles; F-06921 Sophia-Antipolis Cedex; France, vol. RAN WG2, No. Chengdu, China; Oct. 8, 2018-Oct. 12, 2018, Sep. 28, 2018, XP051524248; the whole document.

"3rd Generation Partnership Project; Technical Specification Group Radio Access Network; NR; Medium Access Control (MAC) protocol specification (Release 15)", 3GPP Draft; 38321-F30, 3rd Generation Partnership Project (3GPP), Mobile Competence Centre; 650, Route Des Lucioles; F-06921 Sophia-Antipolis Cedex; France, Oct. 1, 2018, XP051519483; paragraphs [5.17]-[5.18].

Huawei et al., "Consideration on DRX with beam management", R2-1712562 (revision of R2-1710563), 3GPP TSG-RAN WG2#100, Reno, Nevada, USA, Nov. 27-Dec. 1, 2017.

Ericsson, "Contention based random access for beam failure recovery", 3GPP TSG-RAN WG2 #101 R2-1803198, Feb. 16, 2018.

* cited by examiner

METHOD AND APPARATUS OF BEAM FAILURE RECOVERY EXECUTED BY USER EQUIPMENT

FIELD

The present disclosure is generally related to wireless communications, and more particularly, to methods performed by a user equipment related to beam failure recovery (BFR), and a corresponding base station (BS) and user equipment (UE).

BACKGROUND

As mobile communication grows and its technology improves, the world is moving into a community that is a completely interconnected network and that is where anyone or anything can obtain information and share data at anytime and anywhere. It is estimated that there are 50 billion devices that are interconnected in 2020, and among those devices, only 10 billion devices are mobile phones and tablet computers. The rest are devices not communicating between humans but between each other. Therefore, how to design a system that better supports networks connecting all things requires more in-depth study and research.

Studies of the new 5G radio access technology were performed (referring to a non-patent publication: RP-160671 New SID Proposal: Study on New Radio Access Technology) in the #64 plenary meeting for RAN of the 3rd generation partnership program (3GPP) held in March 2016. In the work item, it is disclosed that frequency ranges in the future communication protocol may be expanded to 100 GHz while meeting the requirements of enhanced Mobile Broadband (eMBB), massive Machine-Type Communication (mMTC), and Ultra-Reliable and Low-Latency Communication (URLLC).

In order to allow the UE to work better in high frequency bands, NR utilizes the beamforming technology. Through the technology, transmission energy is focused and the signal quality is improved. In order to guarantee the signal quality during transmission, the UE needs to evaluate the link quality based on the measurement results, and indicates the measurement results to the higher layer to implement the link reconfiguration procedure.

The link reconfiguration procedure requires the UE to receive the measurement signal to measure the link quality, to indicate to the higher layer, when necessary, the beam failure instance (BFI), and to perform beam transmission failure detection.

In the beam failure detection procedure, when the number of BFIs received by the higher layer reaches the threshold, in order to restore the link, the UE triggers a beam transmission failure recovery (BFR) procedure, which initiates a random access (RA) procedure.

SUMMARY

The present disclosure provides a method performed by a user equipment and a user equipment, which can reliably complete a beam transmission failure recovery procedure in a user equipment and thereby, improving the overall reliability and communication efficiency of the communication system related to the user equipment.

According to the present disclosure, there is provided a method performed by a user equipment for beam failure recovery, the method comprising: initiating a random access (RA) procedure if a value of a beam failure instance (BFI) counter is greater than or equal to a threshold, the threshold being configured by an information element (IE) beamFailureInstanceMaxCount; transmitting a RA preamble; starting a RA response window, the RA response window being configured in an IE BeamFailureRecoveryConfig; and monitoring a PDCCH on a search space indicated by an IE RecoverySearchSpaceId while the RA response window is running.

In the above method, optionally, the RA preamble is a contention-free RA preamble for BFR request.

In the above method, optionally, the PDCCH is identified by the C-RNTI. The method further comprising: considering the RA procedure to be successfully completed if the PDCCH on the search space indicated by the IE RecoverySearchSpaceId is received.

According to the present disclosure, there is provided a user equipment, the user equipment comprising: a memory storing instructions, and a processor; the processor configured to perform corresponding operations based on the instructions, the corresponding operations comprising: initiating a random access (RA) procedure if a value of a beam failure instance (BFI) counter is greater than or equal to a threshold, the threshold being configured by an information element (IE) beamFailureInstanceMaxCount; transmitting a RA preamble; starting a RA response window, the RA response window being configured in an IE BeamFailureRecoveryConfig; and monitoring a PDCCH on a search space indicated by an IE RecoverySearchSpaceId while the RA response window is running.

In the above method, optionally, the RA preamble is a contention-free RA preamble for BFR request.

In the above method, optionally, the PDCCH is identified by the C-RNTI. The processor further configured to consider the RA procedure to be successfully completed if the PDCCH on the search space indicated by the IE RecoverySearchSpaceId is received.

Effects of the Present Disclosure

According to the method performed by the user equipment and the user equipment of the present disclosure, the beam transmission failure recovery procedure can be reliably implemented in the user equipment configured with the discontinuous reception (DRX) mode, and thereby, improving the overall reliability and communication efficiency of the communication system related to the user equipment.

BRIEF DESCRIPTION OF THE DRAWINGS

The above and other features of the present disclosure will become more apparent through the following detailed description with reference to the accompanying drawings, in which.

DESCRIPTION

The following descriptions and accompanying drawings contain detailed descriptions of exemplary implementations of the present disclosure. It should be appreciated that the present disclosure is not limited to the implementations disclosed herein. Additionally, for the ease of understanding, the descriptions do not include detailed descriptions of general knowledge not directly related to the present disclosure in order to avoid confusion of the present disclosure.

Prior to detailed descriptions of the implementations, the following paragraphs defines the terms used in the present disclosure. Unless otherwise specified, the terms in the present disclosure contain the following meanings.

UE User Equipment
RLF Radio Link Failure
NR New Radio
LTE Long Term Evolution
eLTE Enhanced Long Term Evolution
RRC Radio Resource Control
MAC Medium Access Control
PHY Physical Layer
PDCCH Physical Downlink Control Channel
PUSCH Physical Uplink Shared Channel
PDSCH Physical Downlink Shared Channel
RA Random Access
PRACH Physical Random Access Channel
SSB Synchronization Signal Block
CSI-RS Channel State Information Reference Signal
MAC CEMAC Control Element
RAR Random Access Response
HARQ Hybrid Automatic Repeat Quest
ACTIVE time Active time/Activated time/Active state/Activated state
Non-ACTIVE time Non-Active time/Non-Activated time/Non-Active state/Non-Activated state
BWP Bandwidth Part
DCI Downlink Control Information
C-RNTI Cell Radio Network Temporary Identifier
IE Information Element
BFI Beam Failure Instance
BFR Beam Failure Recovery For the ease of understanding, the following paragraphs describes implementations applied in NR mobile communications systems and a progression environment. Base stations and UE supporting NR are used as examples to describe various implementations of the present disclosure. However, it should be noted that the present disclosure is not limited to the following implementations. The present disclosure is suitable for various other radio communications systems, such as an eLTE communications system. The present disclosure is also applicable to other base stations and UE, for example, the base stations and UE supporting eLTE.

When the UE measures the link and evaluates the link quality, the specific operations include, measuring a reference signal within a period of time. The measurement result reflects the strength of the reference signal. The UE determine if the strength of the reference signal is greater/less than a preset threshold. This period of time for measuring the reference signal may be referred to as an evaluation period or measurement period, which is a period during which the measurement/evaluation is performed. This is not described in detail below. The time unit of the evaluation period may be milliseconds or the number of slots, or the number of subframes. If the reference signal does not occur continuously, but periodically, then the length of the evaluation period may also be described to include the number of reference signal periods.

During the evaluation period or measurement period, the UE periodically receives the reference signal, performs sampling and measurement, and obtains a signal strength value or maps/converts the strength value to a transmission block error rate. This also means the measurement result obtained through measuring the link quality or signal strength, or the link quality obtained through measurement, is herein collectively referred to as the measurement result. Therefore, during the evaluation period, energy is consumed as the UE receives the reference signal. Subsequent to the evaluation is completed, the UE performs determination according to whether the measurement result of the reference signal is greater/less than the preset threshold. When the measurement result of the measured reference signal is less than the threshold, the PHY of the UE indicates a BFI to a higher layer of the UE, which means a BFI is generated. When the signal strength of the measured reference signal is greater than the threshold, then the PHY of the UE does not perform or indicate any indication to the higher layer of the UE. This determination performed according to the measurement results occurs periodically, and the period may be referred to as an indication period. According to the determination result, at the boundaries of the indication period, if a BFI is generated, the PHY of the UE may indicate the BFI to the higher layer of the UE; and if there is no BFI generated, the UE does not perform or indicate any indication.

Since the determination always occurs at the end of the evaluation period, it may be considered that the UE performs measurement some time before performing indication, and performs indication according to the measurement result. The length of time of the measurement period is equal to the length of time of the evaluation period, that is, the UE performs determination based on the measurement result during the evaluation period before the indication, and then performs indication.

For detecting the beam failure, the above-mentioned measurement is to be performed, and the reference signal commonly used may be SSB or CSI-RS. When it is determined that beam failure instance occurred, the lower layer of the UE, herein mainly refers to the PHY, indicates to the higher layer, mainly refers to the MAC layer, of a BFI. The MAC layer, upon receiving the BFI, increment the value of the counter BFI_COUNTER by one, and start or restart the beam failure detection timer. The time-out (i.e., expiry) of the beam failure detection timer represents an end of an indication period. If a BFI is indicated at this time, then the MAC layer counter BFI_COUNTER continues to increment by 1; if no BFI is indicated, the MAC layer counter BFI_COUNTER is reset to zero. When the value of the MAC layer counter BFI_COUNTER is greater than or equal to the threshold beamFailureInstanceMaxCount, a random access procedure is initiated.

In the initiated random access procedure, the UE may transmit a specific preamble on PRACH resource that is contention-free, or transmit a preamble that is contention-free and used for beam failure recovery request, and start the time window ra-ResponseWindow. The information element (IE) BeamFailureRecoveryConfig is used to configured with the value of the time window. If the UE receives the PDCCH identified by the C-RNTI of the UE during the operation of the time window (e.g., while the time window is running), then the random access procedure is considered to be successfully completed, and thereby, the beam failure recovery procedure is also considered to be successfully completed.

In the initiated random access procedure, the UE may also transmit a preamble on the PRACH resources that is contention based, and then receive a random access response (RAR) sent by the base station. On the uplink resources scheduled in the RAR, the UE transmits Message 3 carrying an identification C-RNTI of the UE, and starts the contention resolution timer. During the operation of the contention resolution timer (e.g., while the contention resolution timer is running), if the UE receives the PDCCH identified by the C-RNTI of the UE, the contention resolution and the random access procedure may be considered to be successfully completed, and thereby, the beam failure procedure is considered to be successfully completed.

The "PDCCH identified by the C-RNTI of the UE" mentioned here refers to the PDCCH scrambled with the C-RNTI of the UE, and may also be referred to as the PDCCH addressed to the C-RNTI.

The DRX mode in the present disclosure refers to that the UE is configured with the DRX function (DRX is configured), or is configured with DRX related parameters, or refers to the UE performing the DRX operation. The non-DRX mode in the present disclosure refers to that the UE is not configured with the DRX function or DRX related parameters, or refers to the UE not performing the DRX operation. When in the DRX mode, the UE continues to monitor the PDCCH periodically, and the period is a DRX cycle. When the UE follows the DRX cycle and wakes up to monitor the PDCCH at ACTIVE time, the UE starts a timer drx-onDurationTimer. During the operation of this timer, the UE continues to monitor the PDCCH. The "continues to monitor the PDCCH" herein refers to receiving the PDCCH at all times when the PDCCH may appear, and detecting whether the PDCCH or the format of the DCI included within is scrambled by the C-RNTI of the UE, that is, if the PDCCH is identified by the C-RNTI of the UE (PDCCH addressed to the C-RNTI). If so, the PDCCH is decoded according to the format of the monitored DCI, and thereby, the information of DCI indicated therein is acquired.

In the DRX mode, the UE may be in an ACTIVE time or a Non-ACTIVE time. The Non-ACTIVE time in the present disclosure refers to the period when the UE is not in the ACTIVE time, or the period not belongs to the ACTIVE time. The UE does not monitor the PDCCH in the Non-ACTIVE time, which means that the moment when the PDCCH may appear occurs during the Non-ACTIVE time of the UE, and the UE does not receive and detect the PDCCH during this moment when the PDCCH may appear.

When the UE is configured with DRX cycle, the ACTIVE time refers to the following moments:
the running time of the timer Drx-onDurationTimer, drx-InactivityTimer, drx-RetransmissionTimerDL, drx-RetransmissionTimerUL, or ra-ContentionResolutionTimer;
when the scheduling request transmitted on the PUCCH is pending;
when, in a random access procedure, if the preamble sequence transmitted is not selected from the random access preamble sequence that is contention based, after successfully receiving the RAR, but has not received a PDCCH identified by to the C-RNTI of the UE.

Figure 1:
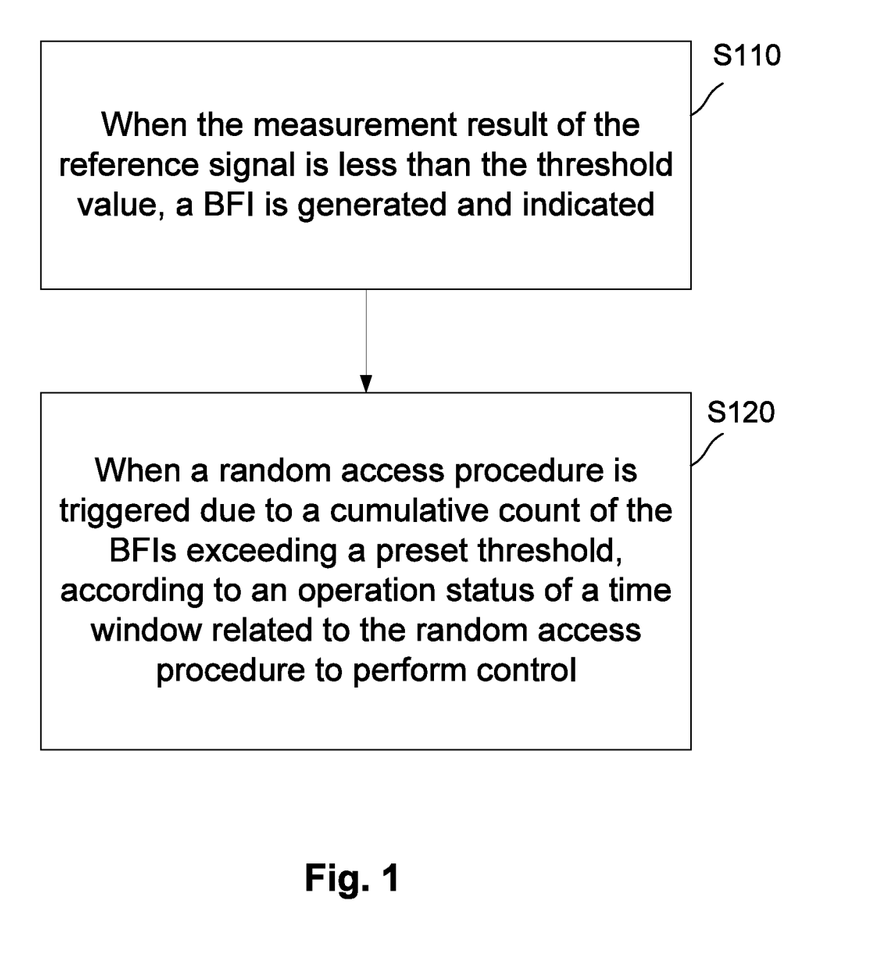
FIG. 1 illustrates a flowchart of a method performed by a user equipment according to an implementation of the present disclosure.

FIG. 1 is flowchart of a method performed by a user equipment (UE) according to an implementation of the present disclosure.

Specifically, the method shown in FIG. 1 includes Step S110 and Step S120.

At Step S110, a beam transmission failure instance (BFI) is generated and indicated when the measurement result of the reference signal is less than the threshold value.

At Step S120, when a random access procedure is initiated due to a cumulative count of the BFIs exceeding a preset threshold, according to an operation status of a time window related to the random access procedure, the control related to the random access procedure is performed. The control related to the random access procedure includes, for example, switching the status of the user equipment.

According to the above method, there is provided a method of preventing the failure of the beam transmission failure recovery procedure in the user equipment that is configured with the DRX mode. For example, when the random access procedure is initiated when the cumulative count of BFIs exceeds the preset threshold, according to an operation status of the time window related to the random access procedure, the control related to the random access procedure is performed.

Therefore, according to the above method, even in the user equipment configured with the discontinuous reception DRX mode, the beam transmission failure recovery procedure can be reliably completed, and thereby, improving the overall reliability and communication efficiency of the communications system related to the user equipment.

Figure 2:
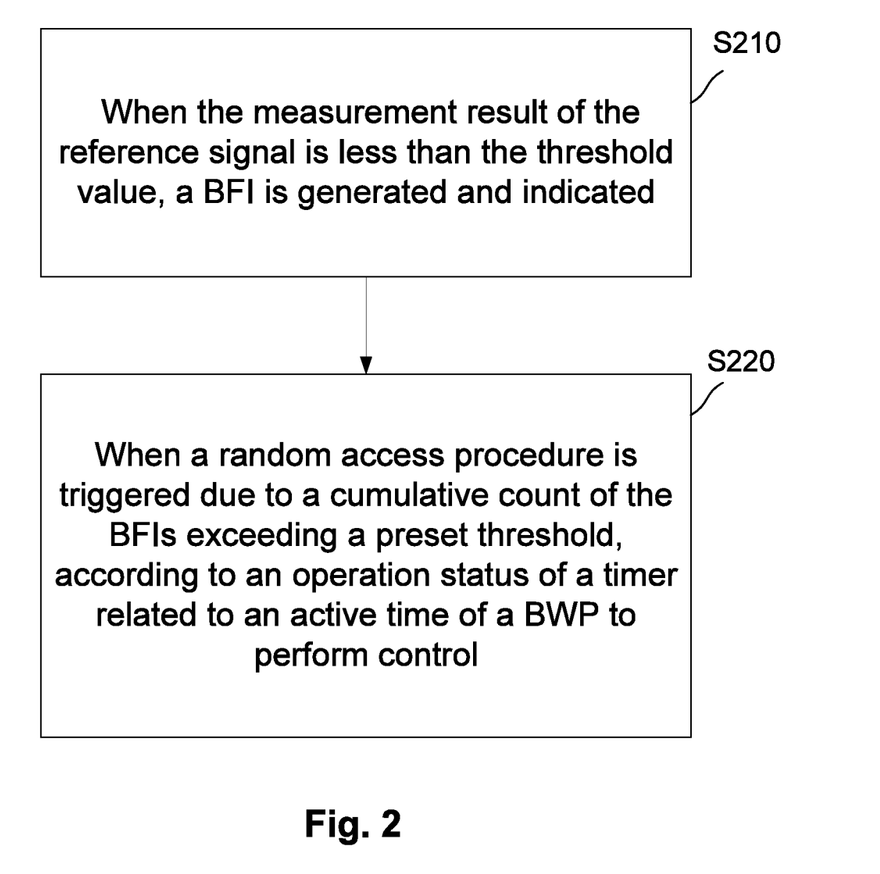
FIG. 2 illustrates a flowchart of a method performed by a user equipment according to another implementation of the present disclosure.

FIG. 2 shows a flowchart of a method performed by a user equipment according to another implementation of the present disclosure. In this method, the user equipment UE is configured with a DRX mode.

Specifically, the method shown in FIG. 2 includes Step S210 and Step S220.

At Step S210, a beam transmission failure instance BFI is generated and indicated when the measurement result of the reference signal is less than the threshold value.

At Step S220, when a random access procedure is initiated due to a cumulative count of the BFIs exceeding a preset threshold, according to an operation status of a timer related to an active time of a bandwidth part (BWP), the control related to the random access procedure is performed. The control related to the random access procedure includes, for example, switching the status of the user equipment.

According to the above method, there is provided a method of preventing the failure of the beam transmission failure recovery procedure in the user equipment that is configured with the DRX mode. For example, according to an operation status of a timer related to an active time of a bandwidth part (BWP), the control related to the random access procedure is performed.

Therefore, according to the above method, even in the user equipment configured with the discontinuous reception DRX mode, the beam transmission failure recovery procedure can be reliably completed, and thereby, improving the overall reliability and communication efficiency of the communications system related to the user equipment.

Figure 3:
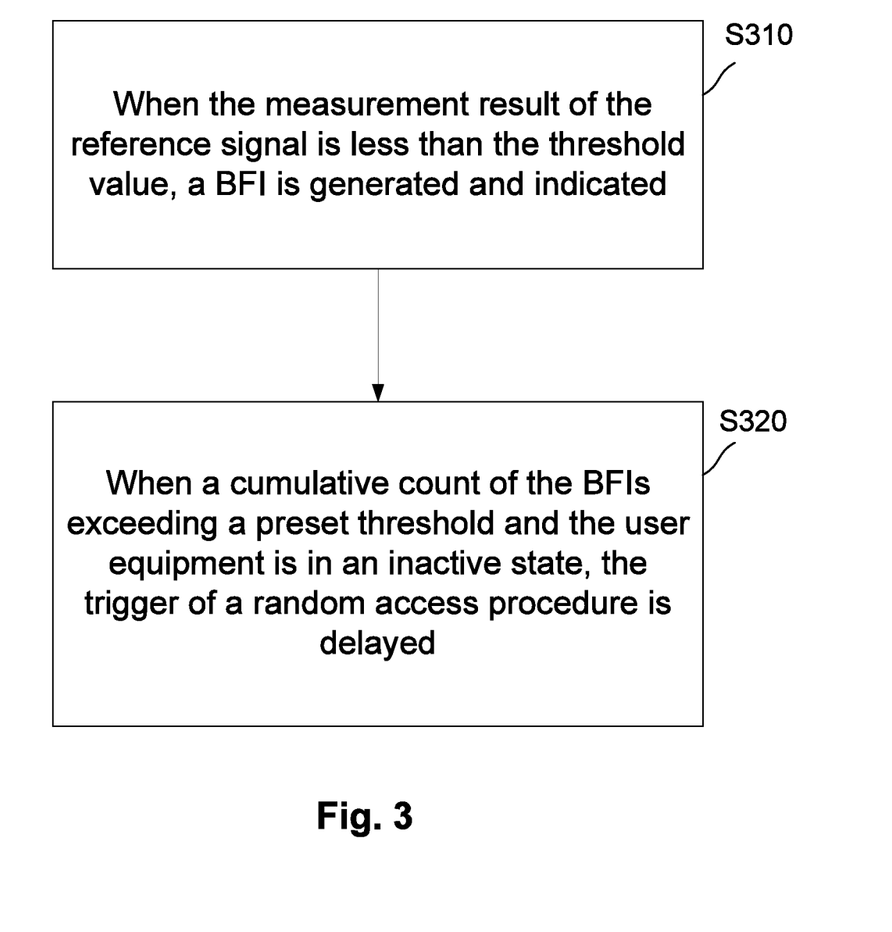
FIG. 3 illustrates a flowchart of a method performed by a user equipment according to another implementation of the present disclosure.

FIG. 3 is a flowchart of a method performed by a user equipment (UE) according to another implementation of the present disclosure. In this method, the user equipment UE is configured with a DRX mode.

Specifically, the method shown in FIG. 3 includes Step S310 and Step S320.

At Step S310, a beam transmission failure instance (BFI) is generated and indicated when the measurement result of the reference signal is less than the threshold value.

At Step S320, when a cumulative count of the BFIs exceeding a preset threshold and the user equipment is in an inactive state, the initiation of a random access procedure is delayed.

According to the above method, there is provided a method for preventing the failure of the beam transmission failure recovery procedure in the user equipment configured with the DRX mode. For example, when the cumulative count of BFIs exceeds the preset threshold and the user equipment is in an inactive state, the initiation of a random access procedure is delayed.

Therefore, according to the above method, even in the user equipment configured with the discontinuous reception DRX mode, the beam transmission failure recovery procedure can be reliably completed, and thereby, improving the overall reliability and communication efficiency of the communications system related to the user equipment. On the other hand, according to the above method, power saving of the terminal can also be achieved.

Subsequent paragraphs describe several implementations of the present disclosure in detail.

Since the moment when the beam failure recovery initiates the RA procedure is only related to the number of reported BFIs, the initiated RA procedure can occur at ACTIVE time or Non-ACTIVE time. Therefore, the PDCCH that is marked with the successful completion of RA and the successful completion of beam failure recovery may be transmitted by the network side during ACTIVE time, and received, or transmitted by the network side during Non-ACTIVE time.

In the present mechanism, when the MAC entity is in the ACTIVE time, it specifies that the UE needs to continuously monitor the PDCCH to determine whether the PDCCH is identified by the C-RNTI of the UE. If the PDCCH is scrambled by the C-RNTI of the UE, the corresponding action is defined for the uplink/downlink transmission/scheduling indicated by the PDCCH. However, when the UE in non-ACTIVE time, the present technology does not support the UE to monitor the PDCCH, which may be problematic. When the above PDCCH, that are marked with the successful completion of RA and the successful completion of beam failure recovery, is transmitted by the network side at Non-ACTIVE time, the UE cannot perform monitoring and successfully receiving due to being in Non-ACTIVE state, which results in the failure of the beam failure procedure as performed by the UE. Therefore, there is a need to solve the failure of the beam failure procedure.

Implementation 1

In order to address the above problem, a method is to expand the definition of ACTIVE time, so that the UE is in the ACTIVE time when transmitting the PDCCH described above, which are marked with the successful completion of RA and the successful completion of beam failure recovery. Thereby, the UE monitors and receives the PDCCH, completes the random access procedure, and completes the beam failure recovery procedure. The specific implementation of the method may be:

when the beam failure recovery procedure is triggered, the time from this moment is included in the ACTIVE time, that is, once the beam failure recovery is triggered, the UE determines that the MAC entity enters/is in the ACTIVE time; or for a random access procedure initiated by the beam failure recovery, the time during which is performed is included in the ACTIVE time; or the time during which the beam failure recovery procedure is performed is included in the ACTIVE time; or when the UE transmits a preamble on a PRACH resource that is contention-free, the time from this moment is included in the ACTIVE time, that is, once the preamble is transmitted on the PRACH resource that is contention-free, the UE determines that the MAC entity enters/is in the ACTIVE time, that is, this time is included in ACTIVE time; preferably, the PRACH resource is used for beam failure recovery.

Alternatively, when the UE transmits a preamble for contention-free (based on contention free), the time from this moment is included in the ACTIVE time, that is, once the preamble is transmitted on PRACH resources that is contention-free, the UE determines that the MAC entity enters/is in the ACTIVE time, that is, the time is included in ACTIVE time; preferably, the preamble is used for beam failure recovery.

In a random access procedure, if the transmitted preamble sequence is selected from the random access preamble sequence that is contention based, after successfully receiving the RAR, a PDCCH identified by to the C-RNTI of the UE has not been received. From this moment on, the UE determines that the MAC entity enters/is in the ACTIVE time, that is, the time is included in the ACTIVE time; or when in a random access procedure initiated by the beam failure recovery, a random access response is successfully received but the PDCCH identified by the C-RNTI of the UE has not been received. From this moment on, the UE determines that the MAC entity enters/is in the ACTIVE time, that is, the time is included in the ACTIVE time; or when the UE is configured with DRX, during the running of ra-ResponseWindow, the UE determines that the MAC entity enters/is in the ACTIVE time, including the operation of switching the inactive state of the UE to the active state. Preferably, the ra-ResponseWindow value is configured in the IE BeamFailureRecoveryConfig, or the value configured to the ra-ResponseWindow is related to the configuration of the beam failure recovery, or the ra-ResponseWindow is configured with a value related to the beam failure recovery. The "during the running of ra-ResponseWindow, the UE determines that the MAC entity enters/is in the ACTIVE time" may be understood as, when ra-ResponseWindow starts, if the MAC entity is in the Non-ACTIVE time, then the MAC entity enters in the ACTIVE time; if the MAC entity is already in the ACTIVE time, then the MAC entity continues to be in the ACTIVE time;

when the ra-ResponseWindow stops running and the MAC entity is still in the ACTIVE time, or when the ra-ResponseWindow stops running, if there is no other triggering conditions that causes the MAC entity to be in ACTIVE time, then when the ra-ResponseWindow stops running, the MAC entity enters in the Non-ACTIVE time.

The "other triggering conditions that cause the MAC entity to be in the ACTIVE time" referred to herein includes any determinations mentioned in other paragraphs of the present disclosure that causes the MAC entity to be in the ACTIVE time.

During the running of ra-ResponseWindow configured in BeamFailureRecoveryConfig, the UE needs to monitor the PDCCH identified by the C-RNTI of the UE on a search space indicated by the IERecoverySearchSpaceId. An alternative method may be: when the UE is configured with DRX, and if monitoring the PDCCH identified by the C-RNTI of the UE in the search space indicated by the IE RecoverySearchSpaceId is needed, the UE then determines that the MAC entity enters/is in the ACTIVE time, including the operation of switching the inactive state of the UE to the active state.

In addition, when the timer bwp-InactivityTimer related to the BWP active time times out, the UE falls back to the initial downlink BWP (initial DL BWP) or the default downlink BWP (default DL BWP), and thereby, the BWP switching occurs. During this procedure, since the UE does not perform continuous link monitoring on the BWP that the UE falls back on, it is likely to detect beam failure, which results in that a beam failure recovery and the corresponding random access procedure being initiated. Since the timeout of bwp-InactivityTimer may occur in the Non-ACTIVE time, there may be a solution that when the UE is configured with DRX and the bwp-InactivityTimer times out, the UE determines that the MAC entity enters/is in the ACTIVE time, including the operation of switching the inactive state of the UE to the active state. The "when the UE is configured with DRX and the bwp-InactivityTimer time out, the UE determines that the MAC entity enters/is in the ACTIVE time" referred herein can be understood as:

When the MAC entity is in the Non-ACTIVE time, and the bwp-InactivityTimer times out, the MAC entity enters in the ACTIVE time;

if there is no other triggering condition that causes the MAC entity to stay in the ACTIVE time, then the ACTIVE time caused by the timeout of bwp-InactivityTimer may continue until the drx-onDurationTimer is started. Once the drx-onDurationTimer is started, the UE continues to be in the ACTIVE time;

it may also be a timer that starts when the bwp-InactivityTimer times out. When this timer is running, the UE is in the ACTIVE time. Thus, a variation of the above scheme is: when the UE is configured with DRX and the bwp-InactivityTimer times out, if the UE is not in the ACTIVE time (or the UE is in the Non-ACTIVE time), a timer is started and the UE determines that the MAC entity enters/is in the ACTIVE time, including the operation of switching the inactive state of the UE to the active state.

Another variation of the above scheme is: when the UE is configured with DRX and the bwp-InactivityTimer times out, if the UE is not in the ACTIVE time (or the UE is in the Non-ACTIVE time), a timer is started; and during the running of the timer, the UE determines that the MAC entity enters/is in the ACTIVE time, including the operation of switching the inactive state of the UE to the active state.

When the timer times out, if there is no other triggering condition that causes the MAC entity to stay in the ACTIVE time, the UE may leave the ACTIVE time, or enter in the Non-ACTIVE time. Once the MAC entity stays in the ACTIVE time due to other triggering conditions, then when these triggering conditions occur, the timer is stopped.

The "other triggering condition that causes the MAC entity to stay in the ACTIVE time" referred to herein includes any determinations mentioned in other paragraphs of the present disclosure that causes the MAC entity to be in the ACTIVE time.

The length of the timer may be pre-configured by the network side, such as via system information/system information block broadcasting, and be transmitted to the UE with a dedicated signaling. The configuration information of this timer can be configured to the UE together with the configuration information of DRX.

Preferably, such a timer may also be implemented with a time window. That is, the starting of the time window is used to replace the running/starting of the timer, the stopping of the time window is used to replace the stopping of the timer, and the timeout of the time window is used to replace the end of the running of the timer, and the operation of the time window is used to replace the operation of the timer. The configuration method of the length of the time window may be the same as the configuration method of the length of the timer.

Since the UE may only distinguishes the ACTIVE time and the Non-ACTIVE time when configured with DRX mode, or DRX cycle, or DRX function, it can be understood that when the UE is configured with DRX mode, or DRX cycle, or DRX function, the above methods may be performed.

Based on one or more of the above methods, the UE is in the ACTIVE time when the network side transmits the PDCCH described above, and thereby, the UE monitors and receives the PDCCH, completes the random access procedure, and further completes the beam failure recovery procedure.

When the UE monitors and receives the PDCCH identified by to the C-RNTI of the UE, the PDCCH may indicate an uplink transmission/scheduling (UL transmission/UL grant), or indicate a downlink transmission/assignment on the PDSCH (DL transmission/DL assignment), or neither indicating uplink transmission/scheduling nor downlink transmission/assignment, but merely responding to the beam failure recovery request of the UE.

In any of the above conditions as indicated by the PDCCH, the UE may start or restart the timer drx-InactivityTimer. During the running of this timer, which belongs to the ACTIVE time, the UE continues to monitor the PDCCH.

Preferably, if the above-mentioned PDCCH indicates the downlink assignment of the PDSCH, after the corresponding PUCCH transmission is completed, the UE starts the timer drx-HARQ-RTT-TimerDL for this HARQ procedure. The "corresponding PUCCH transmission" referred to herein indicates that after receiving the transmission information on the PDSCH, the UE feeds back the ACK/NACK information of the received information to the gNB via the PUCCH. When drx-HARQ-RTT-TimerDL times out, if the downlink data corresponding to the HARQ procedure related to this transmission is not correctly received, the timer drx-RetransmissionTimerDL is started for this HARQ procedure. During the running of the drx-RetransmissionTimerDL, the UE continues to monitor the PDCCH.

Optionally, during the ACTIVE time, if the above-mentioned PDCCH indicates an uplink scheduling/transmission, after the corresponding PUSCH transmission is completed or after the first retransmission of the corresponding PUSCH is completed, the UE starts the timer drx-HARQ-RTT-TimerUL for this HARQ procedure. The "corresponding PUSCH transmission" referred to herein indicates that the uplink data transmitted by the UE on the PUSCH corresponding to the frequency scheduling in the uplink scheduling time indicated by the PDCCH. If the drx-HARQ-RTT-TimerUL times out, the drx-RetransmissionTimerUL is started for the HARQ procedure corresponding to this transmission. During the running of the drx-RetransmissionTimerUL, the UE continues to monitor the PDCCH.

Implementation 2

In order to achieve power saving of the terminals, another implementation may be that when the beam failure recovery is triggered, if the UE is in the Non-ACTIVE time, the UE delays performing the initiating of the random access procedure.

Since the UE may only distinguishes the ACTIVE time and the Non-ACTIVE time when configured with DRX mode, or DRX cycle, or DRX function, it can be understood that when the UE is configured with DRX mode, or DRX cycle, or DRX function, the above methods may be performed.

Specifically, when the number of BFIs received by the higher layer of the UE is greater than or equal to beamFailureInstanceMaxCount, the UE further determines whether the MAC entity is in the ACTIVE time.

If it is in the ACTIVE time, the random access procedure is immediately initiated;

If it is not in ACTIVE time, the initiating of the random access procedure is delayed.

Wherein, delaying of the initiating of the random access procedure may be implemented by the following schemes:

Scheme 1

The length of the delay may be controlled by a time window, specifically, when the number of BFIs received by the higher layer of the UE is greater than or equal to the beamFailureInstanceMaxCount, if the MAC entity of the UE is not in the ACTIVE time and the time window is not running, the time window is running/started.

When the running of the time window ends, the random access procedure for the beam failure recovery is initiated.

During the running of the time window, the random access procedure for the beam failure recovery is not initiated.

The length of the time window may be pre-configured in the information received by the UE from the network side, or may be determined by the UE according to a condition of the link. For example, if the current link is stable in performance and the signal quality does not fluctuate significantly, that is, the signal quality that is continuously measured is greater than a certain threshold, the length of the time window may then be set to a greater value. If the current link is unstable in performance and the signal quality is less than a certain threshold, the length of the time window may then be set to a small value, or even 0. Preferably, the length of the time window may be determined by the physical layer and provided to the MAC layer. The length of the time window may also be determined based on the DRX cycle, active time, the length of the reference signal period, or other information related to the link status.

In some situations, the running of the time window may be stopped, for example, when the UE enters in the ACTIVE time, or when the BWP of the UE or the activated BWP of the UE is switched, for example, when the timer related to the BWP active time times out, the UE needs to fall back to the initial BWP or the default BWP, the running of the time window at this moment may be stopped. When the beamFailureDetectionTimer times out and causes the BFI_COUNTER to be set or reset to 0, the running of the time window may be stopped.

Preferably, such a time window may also be implemented with a timer. That is, the starting of the timer is used to replace the running/starting of the time window, the stopping of the timer is used to replace the stopping of the time window, and the timeout of the timer is used to replace the end of the running of the time window, and the operation of the timer is used to replace the operation of the time window. The configuration method of the length of the timer may be the same as the configuration method of the length of the time window.

Scheme 2

It may also be that the UE delays performing the initiating of the random access procedure until a certain moment or an event occurs, that is, delays the initiating of the random access procedure until a preset moment, or until a specific event occurs, for example, until the UE enters in the ACTIVE time.

when the number of BFIs received by the higher layer of the UE is greater than or equal to the beamFailureInstanceMaxCount, if it is not in the ACTIVE time, the random access procedure is not performed and the parameter beamfailurerecovery is set to be 'pending'.

when the UE enters in the ACTIVE time, the parameter beamfailurerecovery value is determined. If the parameter beamfailurerecovery value is 'pending', the random access procedure for the beam failure recovery is initiated.

Wherein, when the BWP of the UE works or the activated BWP is switched, for example, the timer related to the BWP active time times out, if the parameter beamfailurerecovery is pending, then the parameter beamfailurerecovery value is set to be 'no pending'. It can also be that when the beamFailureDetectionTimer times out and causes BFI_COUNTER to be set or reset to 0, if the parameter beamfailurerecovery is pending, the parameter beamfailurerecovery value is set to be 'no pending'.

Herein, the parameter beamfailurerecovery value is set to 'pending' means that there is a suspended beam failure recovery, and 'no pending' means that there is no suspended beam failure recovery. The value may also be 0 or 1. The value of 1 corresponds to the meaning of 'pending', and the value of 0 corresponds to the meaning of 'no pending', which, however, is not limited here. The initial value of the parameter beamfailurerecovery value can be set to be 'no pending'.

Figure 4:
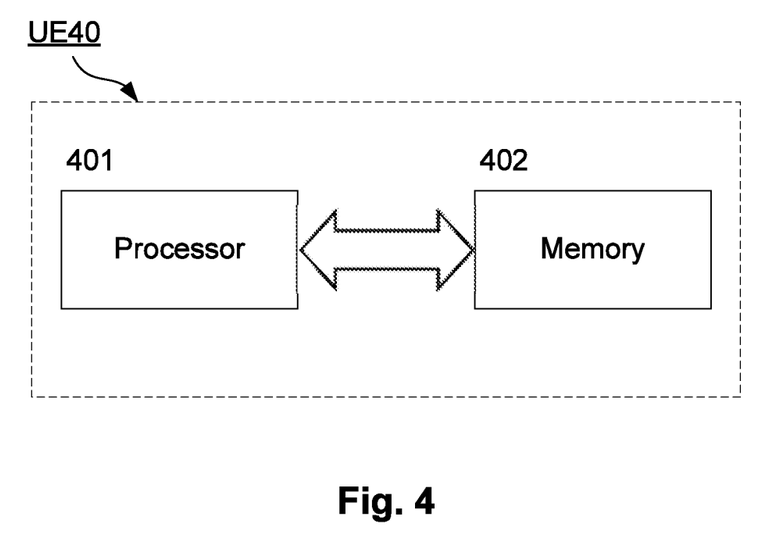
FIG. 4 illustrates a block diagram of a user equipment according to an implementation of the present disclosure.

FIG. 4 is a block diagram of a user equipment 40 according to an implementation of the present disclosure. As shown in FIG. 4, the user equipment 40 comprises a processor 410 and a memory 420. The processor 410, in one example, may comprise a microprocessor, a microcontroller, an embedded processor etc. The memory 420, in one example, may comprise volatile memory (e.g., random access memory RAM), a hard disk drive (HDD), non-volatile memory (e.g., flash memory), or any other memories. The memory 420 stores program instructions. The program instructions, when executed by the processor 410, cause the user equipment to carry out the methods as disclosed herein.

According to the present disclosure, executing programs stored on equipment may be implemented by controlling a Central Processor Unit (CPU) and causing a computer to realize the program functions of the present disclosure. The program or the information being processed by the program may be stored in volatile memory (e.g., random access memory (RAM)), a hard disk drive (HDD), non-volatile memory (e.g., flash memory), or any other suitable memory system.

The program that realizes functions of each implementation in the present disclosure may be stored on a computer-readable medium. Computer systems through reading the programs stored in the storage medium executes the programs to realize the corresponding functions. The "computer system" disclosed herein may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Various characteristics or function modules used in the equipment disclosed in the implementations herein may be realized or implemented by electronics such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

Moreover, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, and other home appliances etc.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A method performed by a user equipment (UE) for a beam failure recovery (BFR), the method comprising:
  after determining that a value of a beam failure instance (BFI) counter is greater than or equal to a threshold that is configured by an information element (IE) beamFailureInstanceMaxCount:
    determining whether a medium access control (MAC) entity of the UE is in an active time when the UE is configured in a discontinuous reception (DRX) mode;
    in a case that the MAC entity of the UE is in the active time, initiating a random access (RA) procedure; and
    in a case that the MAC entity of the UE is not in the active time, delaying initiating the RA procedure, wherein;
    a length of the delay is determined by a length of a time window,
    the length of the time window is determined by the UE based on a quality of a specific signal,
    in a case that the quality of the specific signal is greater than a specific threshold, the length of the time window is set to a first value,
    in a case that the quality of the specific signal is less than the specific threshold, the length of the time window is set to a second value, and
    the RA procedure comprises:
      transmitting an RA preamble;
      starting an RA response window that is configured by an IE BeamFailureRecoveryConfig;
      monitoring a physical downlink control channel (PDCCH) on a search space indicated by an IE Recovery SearchSpaceId while the RA response window is running; and
      considering the RA procedure to be successfully completed when the PDCCH on the search space indicated by the IE Recovery SearchSpaceId is received.

2. The method of claim 1, wherein the RA preamble is a contention-free RA preamble for a BFR request.

3. The method of claim 1, wherein the PDCCH is identified by a cell-radio network temporary identifier (C-RNTI).

4. A user equipment (UE), the UE-comprising:
  one or more processors; and
  at least one non-transitory computer-readable medium coupled to the one or more processors and storing one or more computer-executable instructions that, when executed by the one or more processors, cause the UE to:
  after determining that a value of a beam failure instance (BFI) counter is greater than or equal to a threshold that is configured by an information element (IE) beamFailureInstanceMaxCount:
    determine whether a medium access control (MAC) entity of the UE is in an active time when the UE is configured in a discontinuous reception (DRX) mode;
    in a case that the MAC entity of the UE is in the active time, initiate a random access (RA) procedure; and
    in a case that the MAC entity of the UE is not in the active time, delay initiating the RA procedure, wherein:
    a length of the delay is determined by a length of a time window,
    the length of the time window is determined by the UE based on a quality of a specific signal,
    in a case that the quality of the specific signal is greater than a specific threshold, the length of the time window is set to a first value,
    in a case that the quality of the specific signal is less than the specific threshold, the length of the time window is set to a second value, and
    the RA procedure comprises:
      transmitting an RA preamble;
      starting an RA response window that is configured by an IE BeamFailureRecoveryConfig;
      monitoring a physical downlink control channel (PDCCH) on a search space indicated by an IE Recovery SearchSpaceId while the RA response window is running; and
      considering the RA procedure to be successfully completed when the PDCCH on the search space indicated by the IE Recovery SearchSpaceId is received.

5. The UE of claim 4, wherein the RA preamble is a contention-free RA preamble for a BFR request.

6. The UE of claim 4, wherein the PDCCH is identified by a cell-radio network temporary identifier (C-RNTI).

* * * * *